(12) United States Patent
Soeta et al.

(10) Patent No.: US 11,632,474 B2
(45) Date of Patent: Apr. 18, 2023

(54) COLOR MEASUREMENT APPARATUS AND IMAGE FORMING APPARATUS FOR EXECUTING CALIBRATION OF COLOR MEASUREMENT UNIT

(71) Applicant: CANON KABUSHIKI KAISHA, Tokyo (JP)

(72) Inventors: Yukihiro Soeta, Kanagawa (JP); Teppei Nagata, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/495,694

(22) Filed: Oct. 6, 2021

(65) Prior Publication Data

US 2022/0141354 A1  May 5, 2022

(30) Foreign Application Priority Data

Nov. 5, 2020  (JP) .............................. JP2020-185366

(51) Int. Cl.
*H04N 1/00* (2006.01)
*H04N 1/60* (2006.01)

(52) U.S. Cl.
CPC ..... *H04N 1/00023* (2013.01); *H04N 1/00087* (2013.01); *H04N 1/6019* (2013.01); *H04N 1/6044* (2013.01)

(58) Field of Classification Search
CPC ........... H04N 1/00023; H04N 1/00087; H04N 1/6019; H04N 1/6044; H04N 1/00015; H04N 1/00045; H04N 1/4076; H04N 1/4078; H04N 1/6033; H04N 1/6097
See application file for complete search history.

(56) References Cited

U.S. PATENT DOCUMENTS

| | | | | |
|---|---|---|---|---|
| 4,929,978 A | * | 5/1990 | Kanamori | H04N 1/6033 358/520 |
| 6,222,648 B1 | * | 4/2001 | Wolf | H04N 1/6033 358/504 |
| 10,063,749 B2 | * | 8/2018 | Kuroiwa | H04N 1/00082 |

(Continued)

FOREIGN PATENT DOCUMENTS

| | | | |
|---|---|---|---|
| JP | 2005352051 A | * | 12/2005 |
| JP | 2013-054324 | | 3/2013 |
| JP | 2015210436 A | * | 11/2015 |

OTHER PUBLICATIONS ip.com English translation of JP-2015210436-A (Year: 2015).*

*Primary Examiner* — Scott A Rogers
(74) *Attorney, Agent, or Firm* — Venable LLP

(57) ABSTRACT

A color measurement apparatus comprising: a color measurement unit configured to perform color measurement of an image on a sheet, the color measurement unit including a light source; a reference member used for calibration of the color measurement unit; a moving unit configured to move the color measurement unit to a first position at which the light source irradiates a region other than the reference member with light and a second position at which the light source irradiates the reference member with light; and a control unit configured to, after causing the light source to emit light when the color measurement unit is positioned at the first position, and then moving the color measurement unit to the second position, execute the calibration based on data obtained by causing the light source to irradiate the reference member with light.

17 Claims, 10 Drawing Sheets

(56) References Cited

U.S. PATENT DOCUMENTS

| | | | | |
|---|---|---|---|---|
| 10,154,157 B2* | 12/2018 | Miyanaga | ............ | H04N 1/6044 |
| 10,795,299 B2* | 10/2020 | Itagaki | ................... | G03G 15/55 |
| 11,134,159 B2* | 9/2021 | Kubota | ................ | G01J 3/2803 |
| 11,199,799 B2* | 12/2021 | Itagaki | ............... | G03G 15/5041 |
| 11,386,312 B2* | 7/2022 | Fukasawa | ............ | H04N 1/6094 |
| 11,418,665 B2* | 8/2022 | Nagata | ............... | H04N 1/00602 |
| 2007/0223062 A1* | 9/2007 | Tanaka | ..................... | H04N 1/03 |
| | | | | 358/497 |
| 2013/0243451 A1 | 9/2013 | Hirota et al. | ...... | G03G 15/5025 |
| 2017/0214816 A1* | 7/2017 | Yamakawa | ............ | H04N 1/125 |
| 2021/0360116 A1* | 11/2021 | Nagata | ............... | G03G 15/6573 |
| 2022/0075306 A1* | 3/2022 | Itagaki | ............... | G03G 15/5054 |
| 2022/0236680 A1* | 7/2022 | Soeta | ................ | G03G 15/5041 |

* cited by examiner

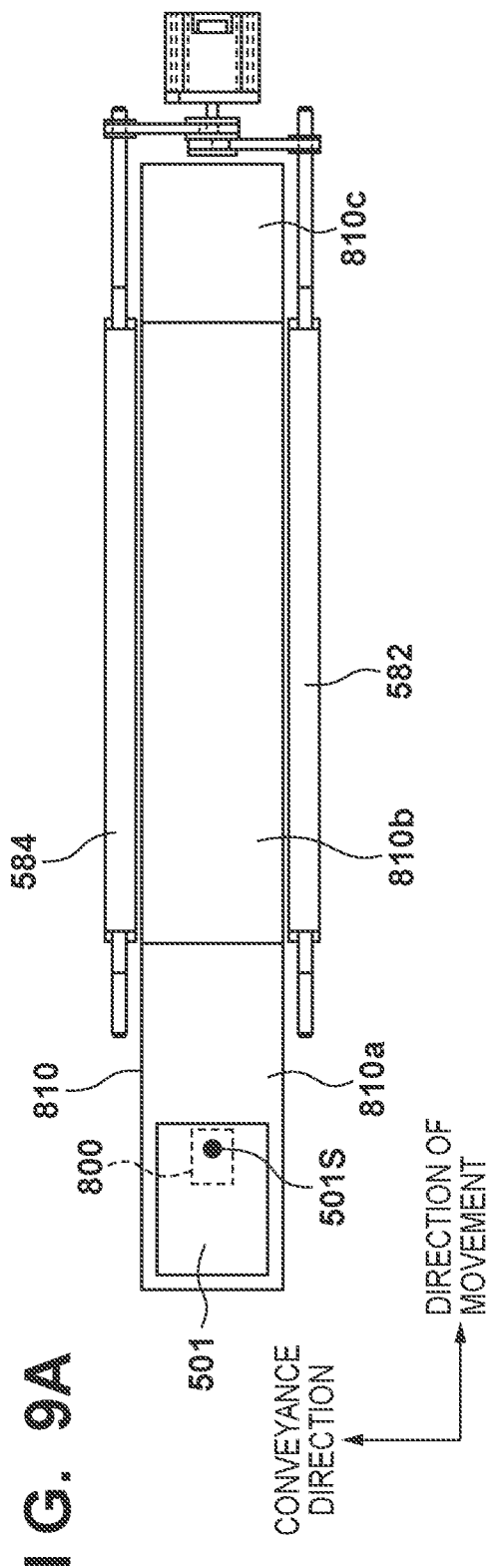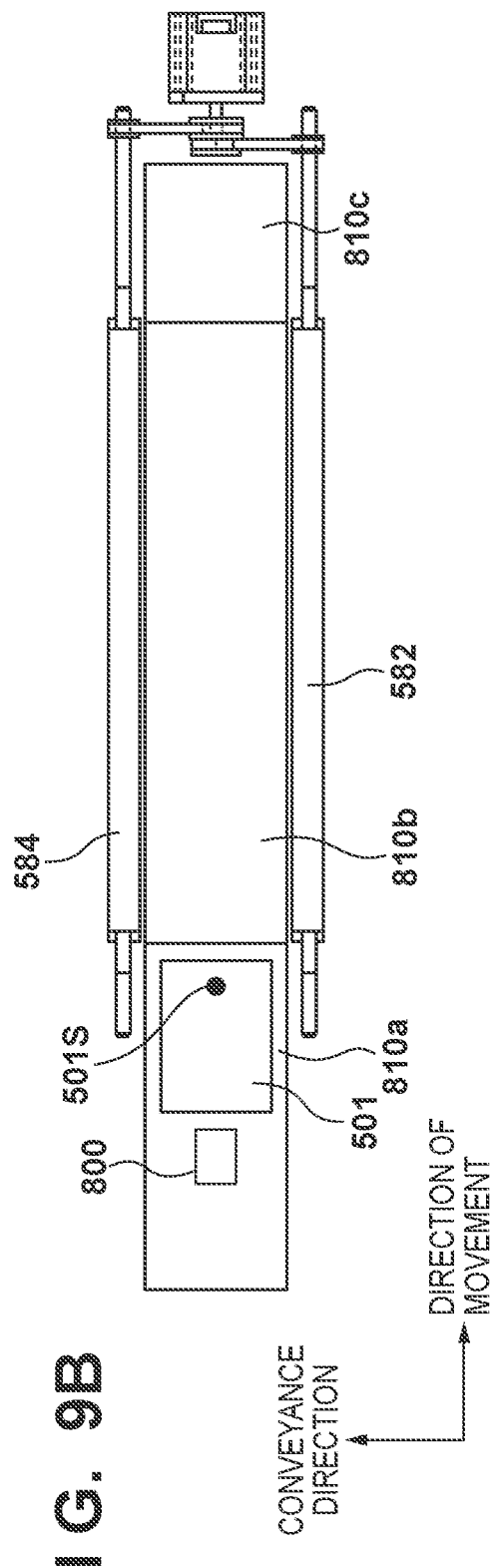

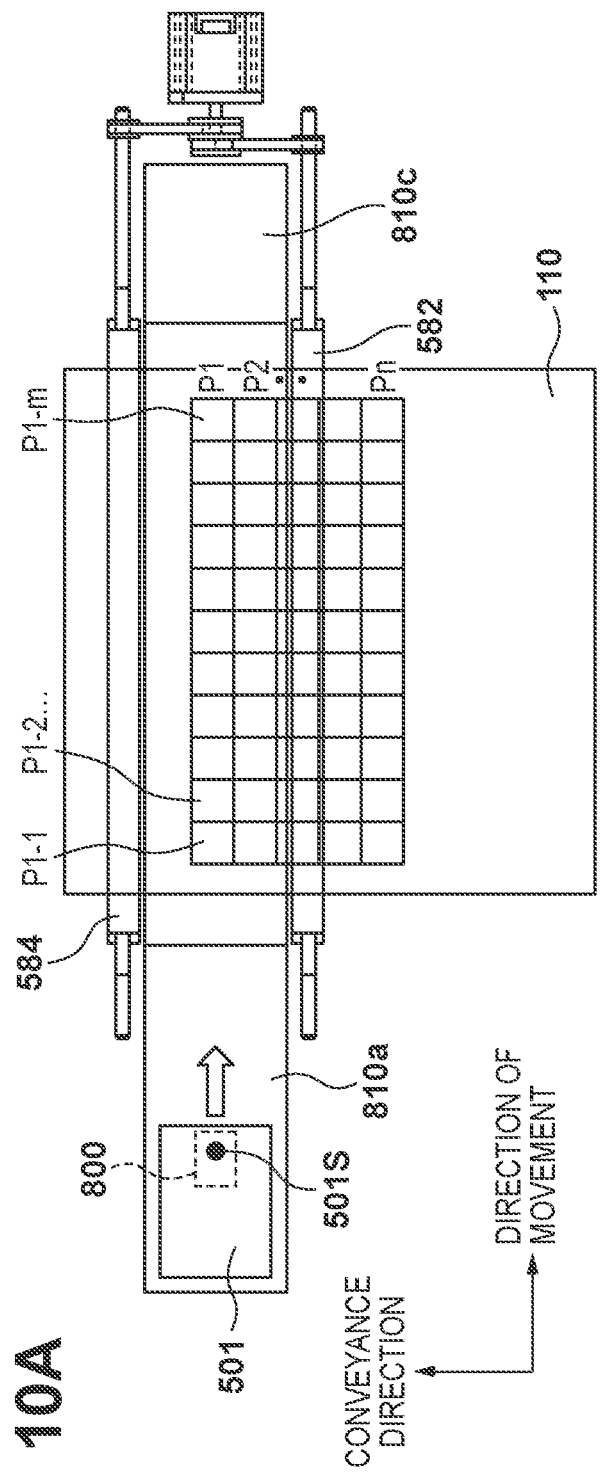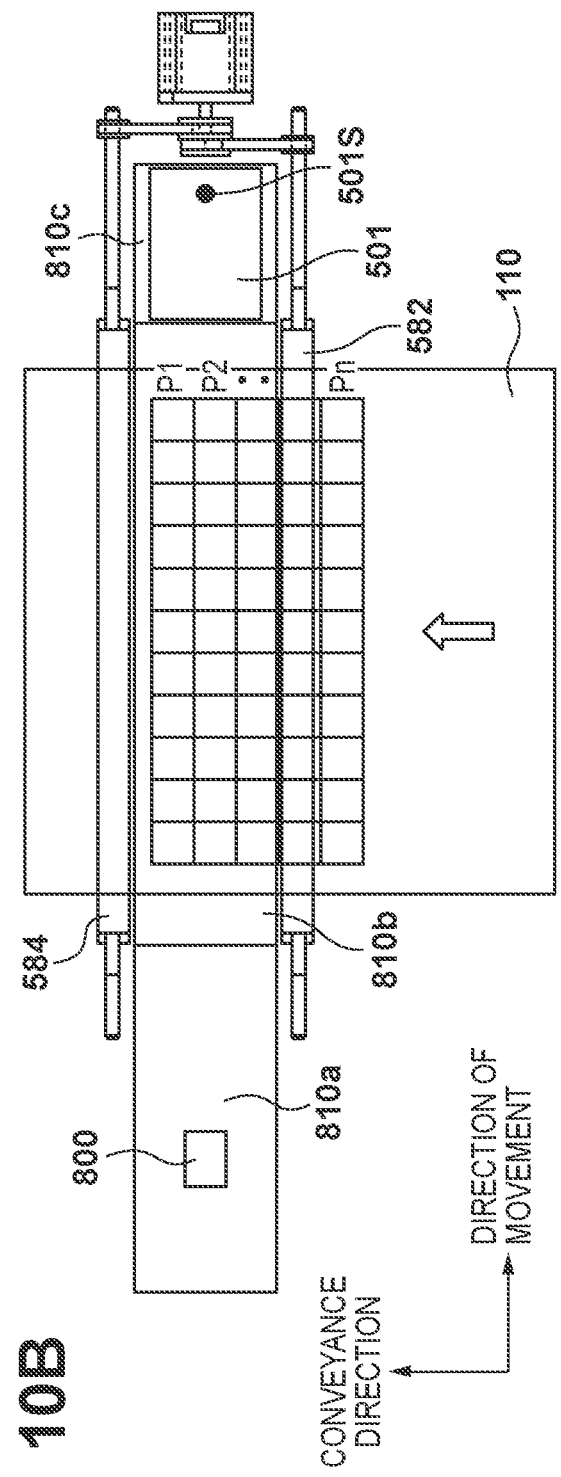

COLOR MEASUREMENT APPARATUS AND IMAGE FORMING APPARATUS FOR EXECUTING CALIBRATION OF COLOR MEASUREMENT UNIT

BACKGROUND OF THE INVENTION

Field of the Invention

The present disclosure relates to a color measurement apparatus and an image forming apparatus.

Description of the Related Art

The quality of an image formed by an image forming apparatus (hereinafter, referred to as "image quality") is evaluated in terms of granularity, in-plane uniformity, letter quality, color reproducibility (including color stability), and the like. In recent years, since multicolor image forming apparatuses have been widespread, color reproducibility is important.

Japanese Patent Laid-Open No. 2013-54324 discloses an image forming apparatus that creates an ICC profile by forming a test image onto a sheet and causing a color sensor to perform color measurement of the test image. It is possible to increase the color reproducibility by forming an image using the ICC profile.

The color sensor performs calibration by performing color measurement of a white reference panel. In addition, at the time of the color measurement, a light source such as an LED is caused to emit light for about 30 to 45 seconds in order to stabilize the light emission luminance thereof. In the following description, the light source being caused to emit light in order to stabilize the light emission luminance thereof is referred to as "performing forced light emission". Due to light emitted through the forced light emission being incident on the white reference panel, there is a risk that the white reference panel will deteriorate.

SUMMARY OF THE INVENTION

The present disclosure provides a technique for suppressing deterioration of a reference member that is used for calibration.

According to an aspect of the present disclosure, a color measurement apparatus comprising: a color measurement unit configured to perform color measurement of an image on a sheet, the color measurement unit including a light source; a reference member used for calibration of the color measurement unit; a moving unit configured to move the color measurement unit to a first position at which the light source irradiates a region other than the reference member with light and a second position at which the light source irradiates the reference member with light; and a control unit configured to, after causing the light source to emit light when the color measurement unit is positioned at the first position, and then moving the color measurement unit to the second position, execute the calibration based on data obtained by causing the light source to irradiate the reference member with light.

Further features of the present invention will become apparent from the following description of exemplary embodiments with reference to the attached drawings.

BRIEF DESCRIPTION OF THE DRAWINGS

FIGS. 9A and 9B are diagrams illustrating operations at the time of color measurement.

FIGS. 10A and 10B are diagrams illustrating operations at the time of color measurement.

DESCRIPTION OF THE EMBODIMENTS

Figure 1:
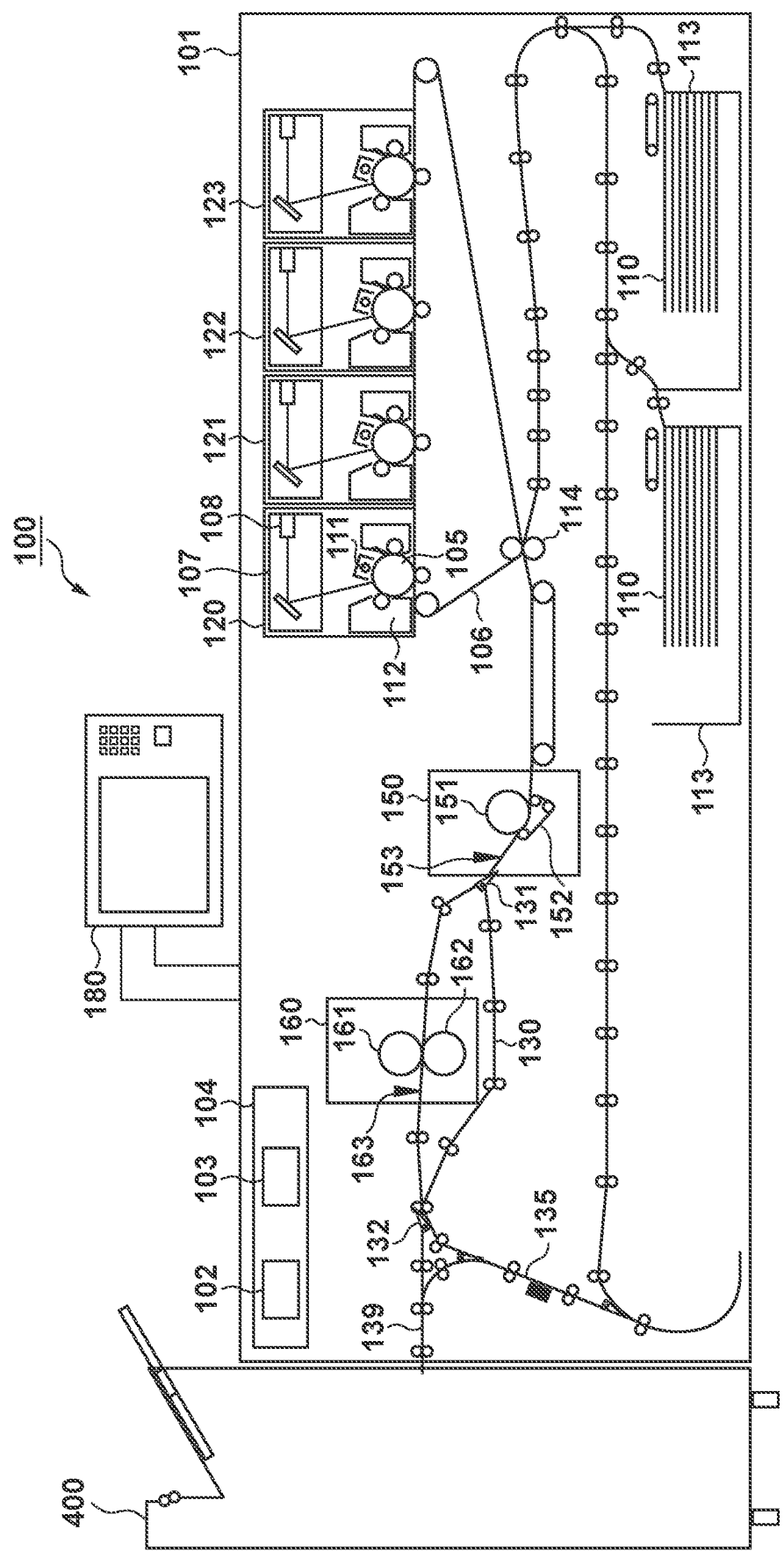
FIG. 1 is a diagram of a configuration of an image forming apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a diagram of a configuration of an image forming apparatus 100. The image forming apparatus 100 includes a main body unit 101 and an adjustment unit 400. A control board housing unit 104 of the main body unit 101 includes a printer controller 103 and an engine control unit 102. The printer controller 103 performs overall control of the image forming apparatus 100. The engine control unit 102 controls the members of the main body unit 101 so as to perform image formation control and the like on a sheet 110, under control of the printer controller 103. The sheet 110, which is also called recording paper, paper, a recording medium, or the like, is an image forming target by the image forming apparatus 100. An operation unit 180 provides a user interface for the user to operate the image forming apparatus 100, and the user interface displays the state of the image forming apparatus 100 to the user.

The image forming apparatus 100 includes four stations 120 to 123 respectively corresponding to yellow (Y), magenta (M), cyan (C), and black (K). The stations 120 to 123 have the same configuration except for the colors of toner that is used, and respectively form toner images of the corresponding colors onto a photosensitive member 105. The photosensitive member 105 is a type of image carrier, and, at the time of image formation, is charged to a uniform surface potential by a charging device 111. A light scanning unit 107 causes a laser 108 to emit a laser beam that is based on image data, and scans the photosensitive member 105 with the laser beam, thereby forming a latent image on the photosensitive member 105. A developing device 112 develops the latent image using toner (color material) and thereby forms a toner image on the photosensitive member 105. The toner image is primarily transferred to an intermediate transfer body 106. The toner image formed on the intermediate transfer body 106 is secondarily transferred to the sheet 110 conveyed from a housing 113 by a transfer roller 114.

The image forming apparatus 100 according to the present embodiment includes a first fixing device 150 and a second fixing device 160 that heat and pressurize a toner image transferred to the sheet 110 and fix it to the sheet 110. The first fixing device 150 includes a fixing roller 151 for heating the sheet 110, a pressurizing belt 152 for pressure-welding the sheet 110 to the fixing roller 151, and a first fixed-state sensor 153 that detects that fixation is complete. The second fixing device 160 is downstream of the first fixing device 150 in the conveyance direction of the sheet 110. The second fixing device 160 applies gloss to or ensures fixability of the toner image on the sheet 110 fixed by the first fixing device 150. Similarly to the first fixing device 150, the second fixing device 160 also includes a fixing roller 161, a pressing roller 162, and a second fixed-state sensor 163. Depending on the type of sheet 110, the sheet 110 does not need to pass through the second fixing device 160. In this case, the image forming apparatus 100 conveys the sheet 110 using a conveyance route 130. A flapper 131 makes a switch between guiding the sheet 110 to the conveyance route 130 and guiding the sheet 110 to the second fixing device 160.

A flapper 132 is a guiding member for guiding the sheet 110 to a conveyance route 135 or a conveyance route 139. When, for example, forming images on the two sides of the sheet 110, the sheet 110 is conveyed toward the conveyance route 135. Note that processing for forming images on the two sides of the sheet 110 and the like is not necessary for describing the present embodiment, and thus a description of such processing is omitted. Whatever the case may be, the sheet 110 is ultimately conveyed to the adjustment unit 400 via the conveyance route 139.

Figure 2:
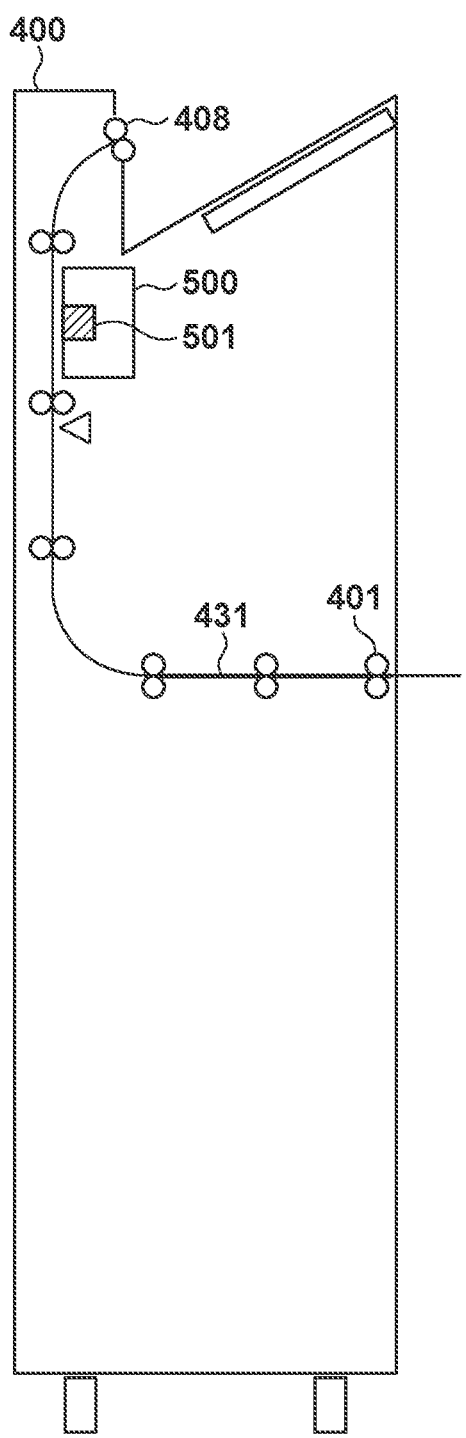
FIG. 2 is a diagram of a configuration of an adjustment unit.

FIG. 2 is a diagram of a configuration of the adjustment unit 400. Supply rollers 401 supply the sheet 110 from the main body unit 101 to the adjustment unit 400. The sheet is conveyed along a conveyance route 431 by a plurality of conveyance rollers provided along the conveyance route 431, and is discharged to the outside of the image forming apparatus 100 by discharge rollers 408. A color measurement unit 500 includes a color sensor 501, and the color sensor 501 performs color measurement of the sheet 110 that is being conveyed on the conveyance route 431.

Figure 3:
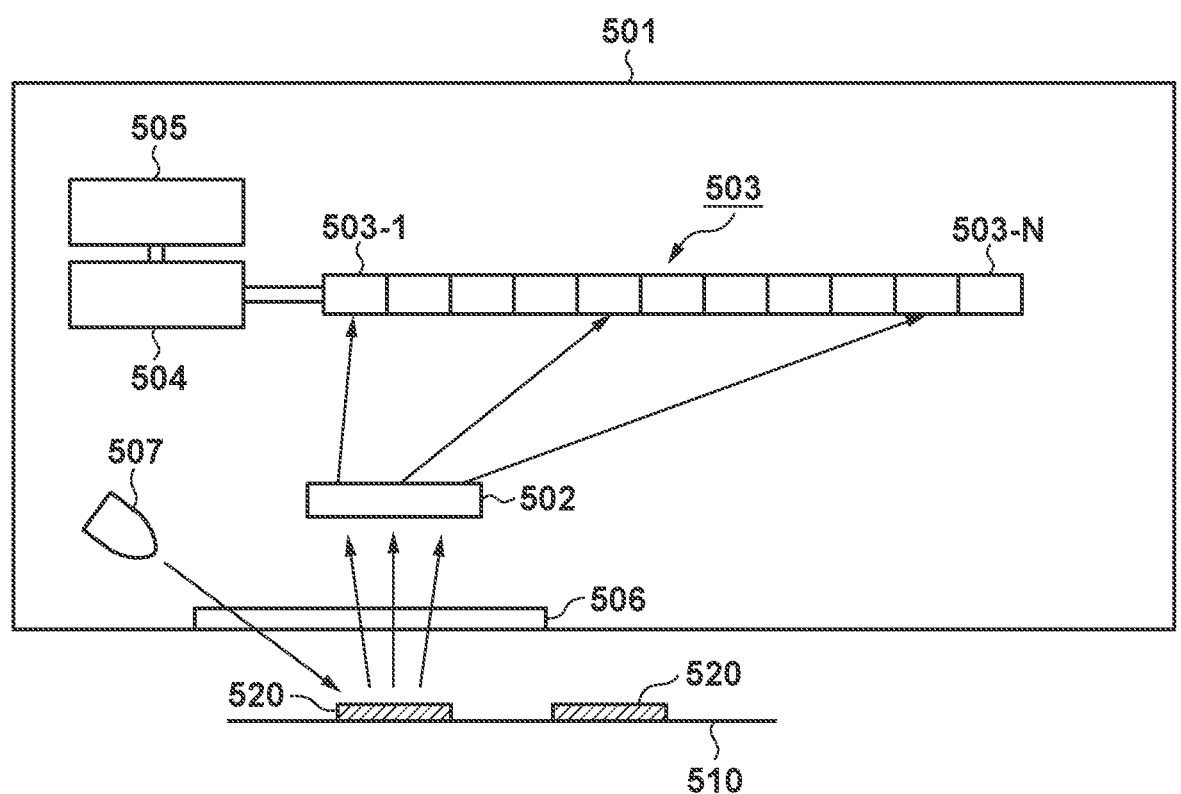
FIG. 3 is a diagram of a configuration of a color sensor.

FIG. 3 is a diagram of a configuration of the color sensor 501. A light source 507 is a light-emitting element that irradiates patches 520 of a test image on the sheet 110 with light. A diffraction grating 502 is a spectral component that separates light reflected by the patches 520 by wavelength. A line sensor 503 is a light detection element provided with N light receiving elements 503-1 to 503-N that detect light decomposed by wavelength by the diffraction grating 502. A computation unit 504 performs various forms of calculation based on received light amounts of light receiving elements (pixels) detected by the line sensor 503. A memory 505 stores various types of data that are used by the computation unit 504. The color sensor 501 may include a lens 506 for collecting light emitted by the light source 507, to the patches 520 of the test image on the sheet 110, and collecting reflected light from the patches 520, to the diffraction grating 502.

Figure 4A:
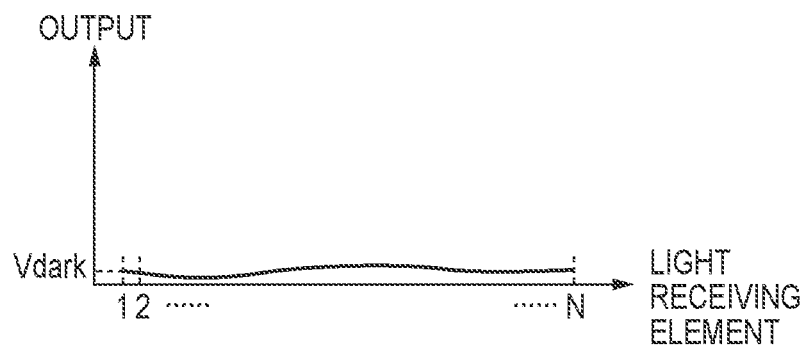
FIGS. 4A to 4E are diagrams illustrating color measurement performed by a color sensor.
Figure 4B:
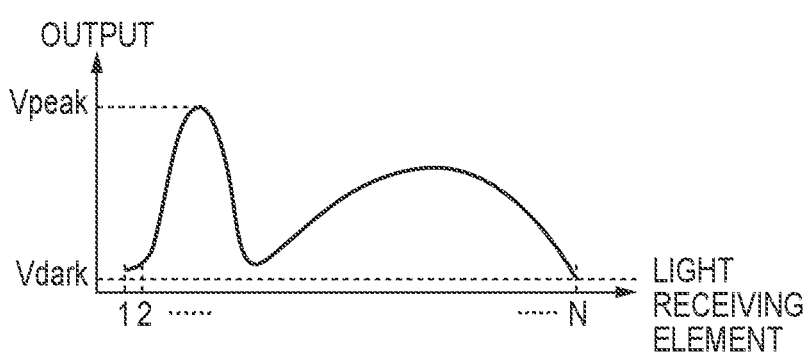
Figure 4C:
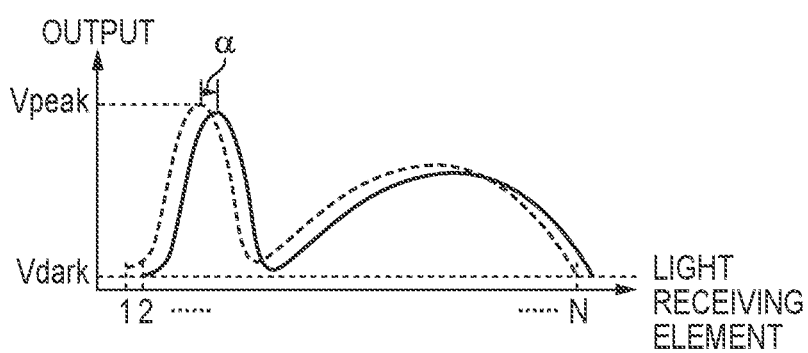
Figure 4D:
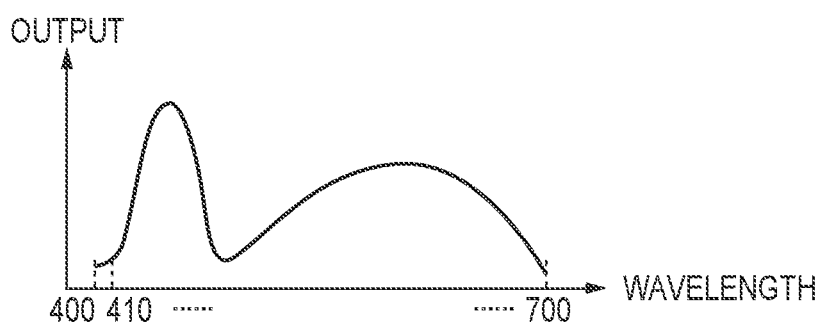
Figure 4E:
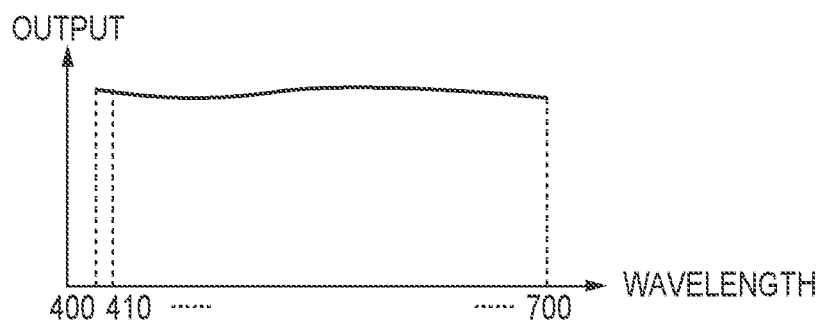

FIGS. 4A to 4E are diagrams illustrating color measurement processing that is performed by the color sensor 501. Note that, in FIGS. 4A to 4E, output currents of the light receiving elements 503-1 to 503-N of the line sensor 503 are converted into voltages and displayed. Before starting measurement, the computation unit 504 causes the light source 507 to perform forced light emission for a predetermined period, and stabilizes the light emission luminance of the light source 507. Next, the computation unit 504 turns off the light source 507, and measures dark voltages obtained by converting dark currents of the light receiving elements 503-1 to 503-N of the line sensor 503 into voltages. FIG. 4A shows an exemplary measurement result of dark voltages (Vdark). Next, the computation unit 504 causes the light source 507 to emit light to irradiate a white reference panel 800 (see FIGS. 8 to 10B), and causes the line sensor 503 to receive reflected light from the white reference panel 800. The white reference panel 800 is a reference member that is used as a reference for a white color by the color sensor 501. Note that, at this time, the computation unit 504 adjusts and corrects the light emission luminance of the light source 507 such that the peak value (Vpeak) of output of the line sensor 503 matches a target value. The target value is stored in the memory 505. FIG. 4B shows output voltages of the light receiving elements 503-1 to 503-N when the white reference panel 800 is irradiated with light emitted by the light source 507 after the light emission luminance of the light source 507 has been adjusted. The computation unit 504 obtains spectroscopy data indicating spectral reflectance by subtracting the dark voltages from the output voltages of the light receiving elements 503-1 to 503-N, the spectroscopy data being indicated by the solid line in FIG. 4C.

The memory 505 holds reference data, which is spectroscopy data of the white reference panel 800 measured at the time of factory shipment. The dotted line in FIG. 4C indicates the reference data. The computation unit 504 determines a position shift amount, in other words a wavelength shift amount of each light receiving element by comparing the obtained spectroscopy data with the reference data. The computation unit 504 then calculates an output voltage for each wavelength such as that shown in FIG. 4D in consideration of this wavelength shift amount. The computation unit 504 stores the result in FIG. 4D as spectroscopy data $W(\lambda)$ of the white reference panel 800, to the memory 505. Note that $\lambda$ indicates wavelength. When each patch of the test image is actually measured, the computation unit 504 obtains a measurement result $M(\lambda)$ such as that shown in FIG. 4E, for example. The computation unit 504 calculates spectroscopy data $Rp(\lambda)$ of the patch of the test image using the following expression, for example.

$$Rp(\lambda)=M(\lambda)/W(\lambda) \times R(\lambda) \tag{1}$$

$R(\lambda)$ is the reflectance of the white reference panel 800, and the value thereof is stored in the memory 505. The color sensor 501 outputs the spectroscopy data $Rp(\lambda)$ of each patch of the test image as a color measurement result to the printer controller 103.

Figure 5:
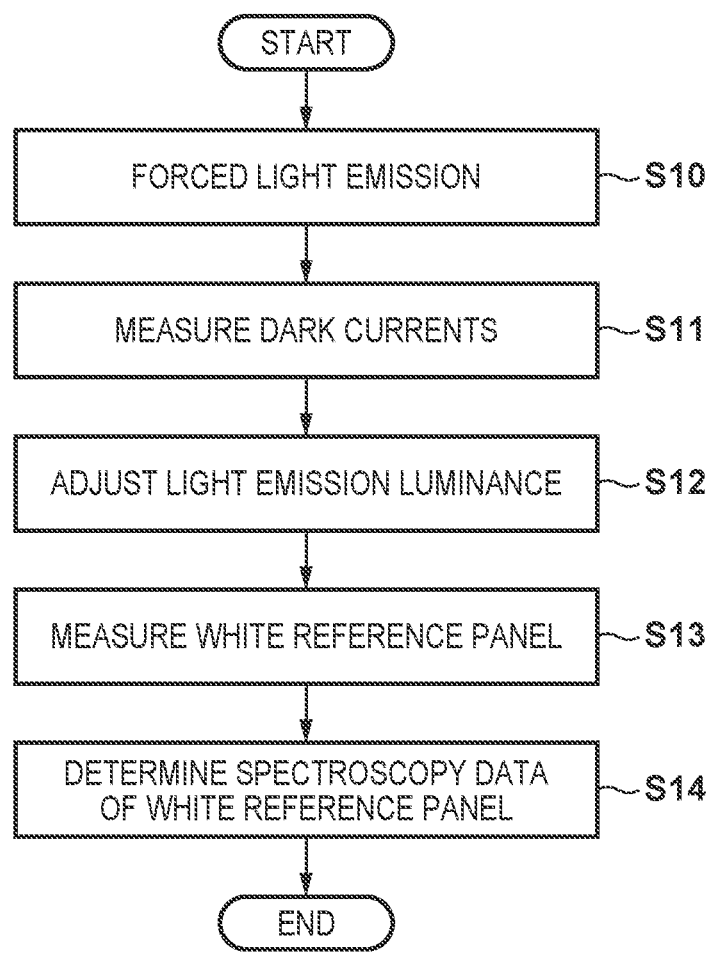
FIG. 5 is a flowchart of calibration processing.

FIG. 5 is a flowchart of calibration processing of the color sensor 501. In step S10, the computation unit 504 causes the light source 507 to perform forced light emission in order to stabilize the light emission luminance of the light source 507. Note that a time until when the light emission luminance stabilizes is correlated with a time until when the temperature of the light source 507 stabilizes. Next, the computation unit 504 causes the light source 507 to stop light emission, and measures dark currents of the light receiving elements of the line sensor 503 in step S11. The computation unit 504 then causes the light source 507 to emit light to irradiate the white reference panel 800, and causes the light receiving elements to receive reflected light from the white reference panel 800. In step S12, the computation unit 504 adjusts the light emission luminance of the light source 507 such that the highest value Vpeak in the output voltages of the light receiving elements reach a target value. After the light emission luminance of the light source 507 has been adjusted, measurement is performed on the white reference panel 800 in step S13, and data shown in FIG. 4B is obtained. In step S14, the computation unit 504 obtains spectroscopy data of the white reference panel 800 such as that shown in FIG. 4D, based on the measurement result in step S13, the dark currents measured in step S11, and the reference data stored in the memory 505.

The image forming apparatus 100 creates a profile based on the color measurement result of the test image, converts an input image using the profile, and forms an output image. In the present embodiment, an ICC profile that is accepted in the market in recent years is used as a profile for realizing high color reproducibility. Note that the present disclosure is not limited to using an ICC profile. The present disclosure is also applicable to CRD (Color Rendering Dictionary) adopted in PostScript Level 2 and later proposed by Adobe, Inc., a color separation table in Photoshop, and CMYK simulation in ColorWise of EFI, Inc. that holds keyplate information, for example.

When a component is replaced by a customer engineer, before a job that requires color matching accuracy, when the color of a final output article is desired to be known, for example, during a design conception stage, or the like, the user performs an operation on the operation unit 180 and gives an instruction of processing for creating a color profile.

Figure 6:
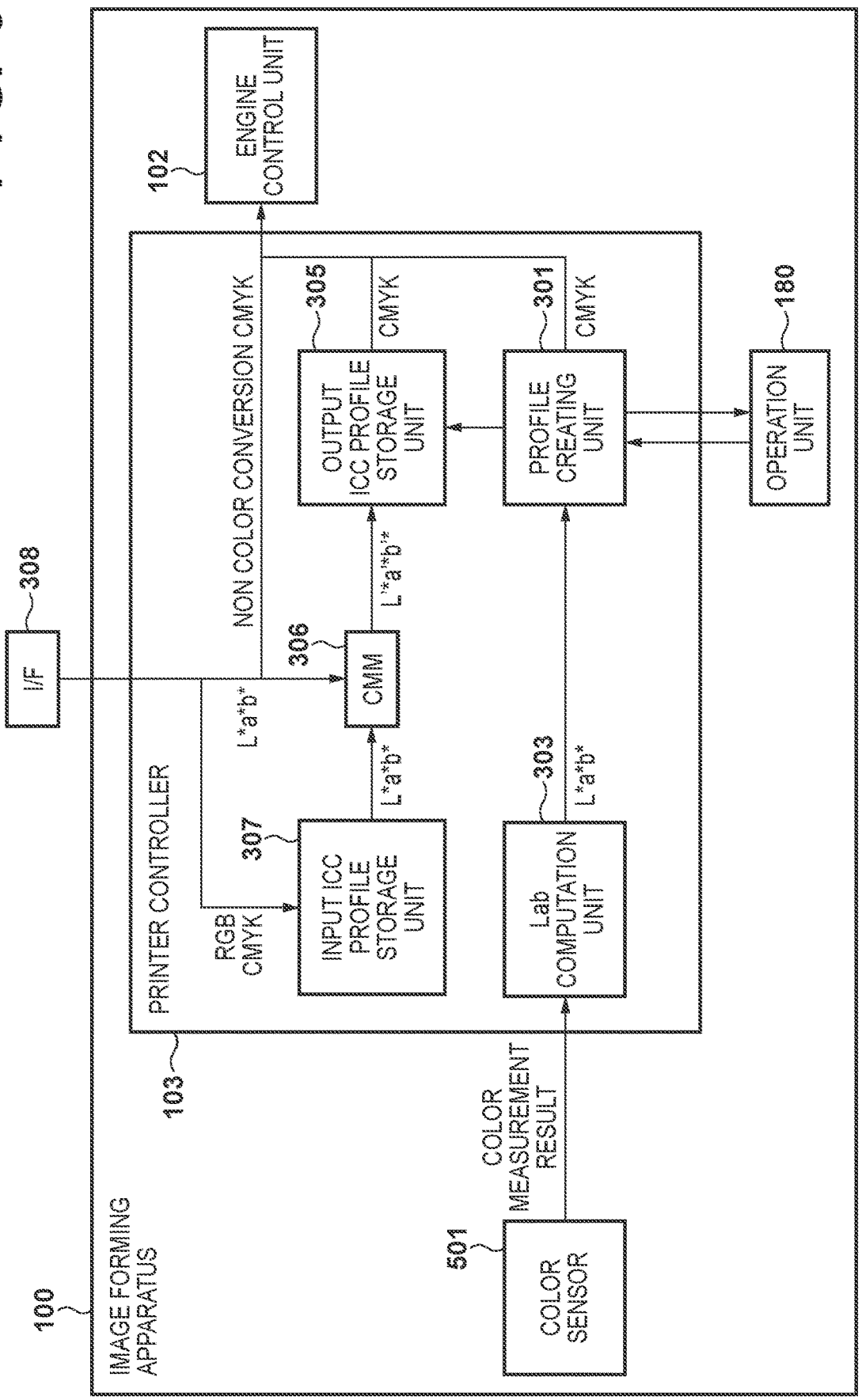
FIG. 6 is a diagram of functional blocks of the image forming apparatus related to color management.

Processing for creating a profile is performed by the printer controller 103 shown in the block diagram in FIG. 6. When the operation unit 180 accepts an instruction to create a profile, a profile creating unit 301 outputs data indicating a CMYK color chart (test image), which has an ISO12642 test form, to the engine control unit 102 without intervention by an output ICC profile storage unit 305. As described with reference to FIG. 1, the engine control unit 102 forms a test image on the sheet 110. In addition, the printer controller 103 instructs the color sensor 501 to perform color measurement of the test image. The color sensor 501 performs color measurement of the test image in accordance with the instruction, and outputs spectroscopy data, which is a color measurement result, to a Lab computation unit 303 of the printer controller 103. The Lab computation unit 303 converts the spectroscopy data into L*a*b* data, and outputs the data to the profile creating unit 301. Note that the Lab computation unit 303 may convert the spectroscopy data into a CIE1931XYZ color coordinate system, which represents a color space signal that does not depend on a device.

The profile creating unit 301 creates an output ICC profile based on the relationship between CMYK color signals output to the engine control unit 102 and the L*a*b* data input from the Lab computation unit 303. The profile creating unit 301 stores the created output ICC profile in place of the output ICC profile stored in the output ICC profile storage unit 305, thereby updating the output ICC profile.

The ISO12642 test form (test image) includes a plurality of patches of CMYK color signals that cover the color reproduction area that can be output by an ordinary copier. The profile creating unit 301 creates a color conversion table based on the relationship between color signal values and L*a*b* values that underwent color measurement. That is to say, a CMYK-to-L*a*b* conversion table is created. A reverse conversion table, in other words, a L*a*b*-to-CMYK conversion table is created based on this conversion table, and is used as an output ICC profile.

When an instruction to create a profile is accepted from a host computer through an I/F 308, the profile creating unit 301 outputs the created output ICC profile to the host computer through the I/F 308. The host computer can execute color conversion corresponding to the output ICC profile, using an application program.

RGB signal values input from a scanner or the like via the I/F 308 and standard print CMYK signal values of Japan-Color or the like are transmitted to an input ICC profile storage unit 307. The input ICC profile storage unit 307 executes RGB-to-L*a*b* conversion or CMYK-to-L*a*b* conversion in accordance with the image signals input from the I/F 308. The input ICC profile stored in the input ICC profile storage unit 307 is constituted by a plurality of LUTs (lookup tables). These LUTs include, for example, a one-dimensional LUT for controlling gamma of input signals, a multiple order color LUT that is called "direct mapping", and a one-dimensional LUT for controlling gamma of generated conversion data. Input image signals are converted from a color space that depends on a device into L*a*b* data that does not depend on a device, using these LUTs. The input ICC profile storage unit 307 outputs L*a*b* image signals to a CMM 306. "CMM" is an abbreviation for color management module. Note that, for example, when L*a*b* image signals are input via the I/F 308, the L*a*b* image signals are directly input to the CMM 306.

The CMM 306 executes various forms of color conversion. The CMM 306, for example, executes GUMAT conversion for mapping a mismatch in the output color reproduction range between a reading color space of a scanner unit or the like that is an input device and the image forming apparatus 100 that is an output device. In addition, the CMM 306 executes color conversion for adjusting a mismatch between the type of light source at the time of input and the type of light source when an output article is observed (also referred to as "mismatch of color temperature setting"). In this manner, the CMM 306 converts L*a*b* data into L'*a'*b'* data, and outputs the L'*a'*b'* data to the output ICC profile storage unit 305. A profile created through color measurement is stored in the output ICC profile storage unit 305. Thus, the output ICC profile storage unit 305 performs color conversion of the L'*a'*b'* data into CMYK signals that depend on an output device, using the newly created ICC profile, and outputs the CMYK signals to the engine control unit 102. Note that, when color conversion of CMYK signals input via the I/F 308 is not performed, the CMYK signals are output to the engine control unit 102.

Figure 7:
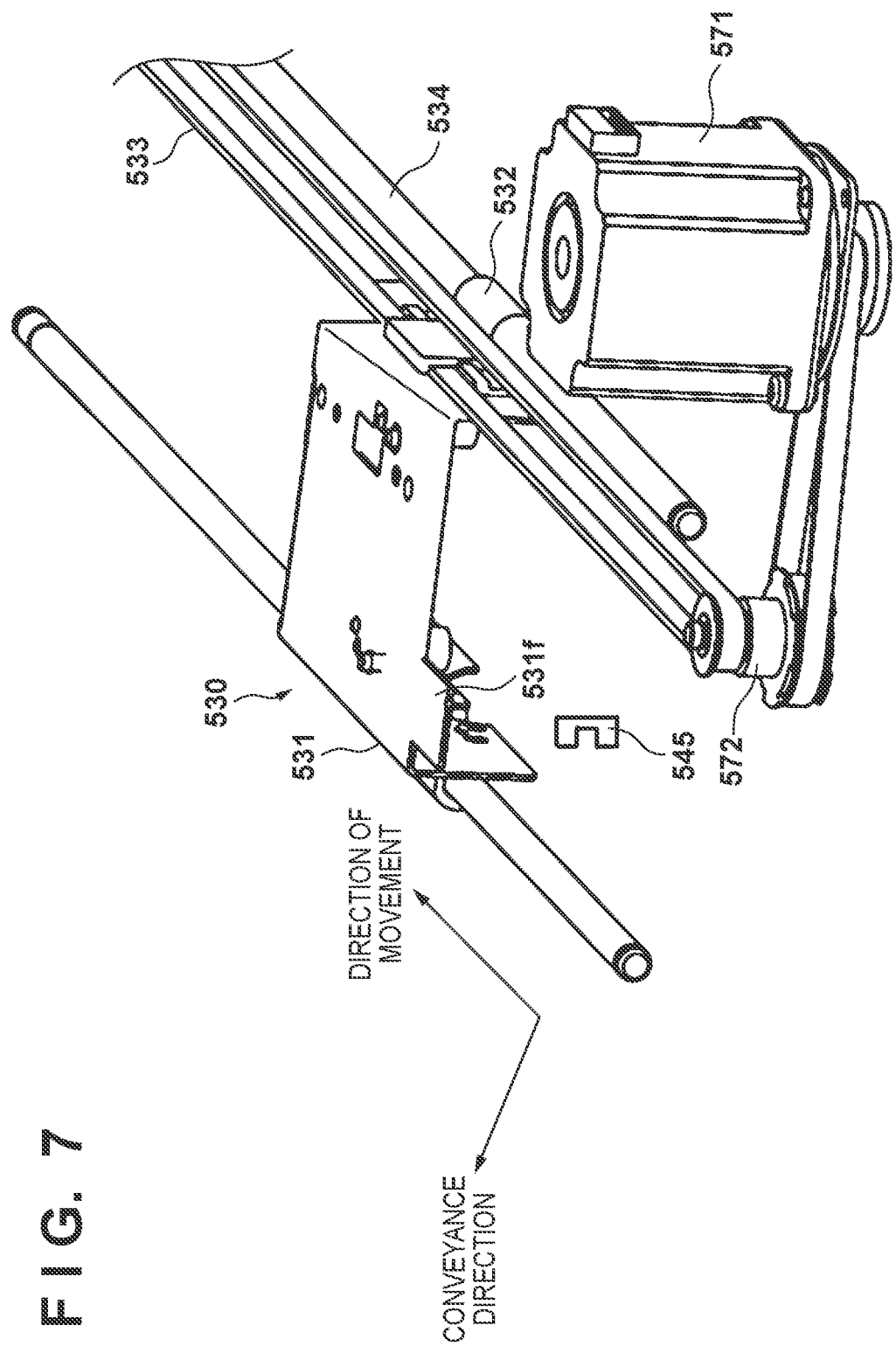
FIG. 7 is a schematic diagram of a configuration of a color measurement unit.

Next, the color measurement unit 500 according to the present embodiment will be described in detail. The color measurement unit includes a moving mechanism for moving the color sensor 501 in a predetermined direction of movement. In the present embodiment, the direction of movement of the color sensor 501 is orthogonal to the conveyance direction of the sheet 110. FIG. 7 is a perspective view of the moving mechanism of the color measurement unit 500. A moving unit 530 holds the color sensor 501. Note that, in FIG. 7, the color sensor 501 is not illustrated for simplification of the figure. A moving-shaft bearing 532 of the moving unit 530 is engaged with a moving belt 533 and a moving shaft 534. The moving belt 533 is engaged with a moving motor 571 via a moving pulley 572. Thus, the moving unit 530 moves in the direction of movement by driving the moving motor 571. Note that the position of the moving unit 530 is determined using, as a reference, a position at which a slide position detection sensor 545 detects a flag portion 531f of the moving unit 530.

Figure 8:
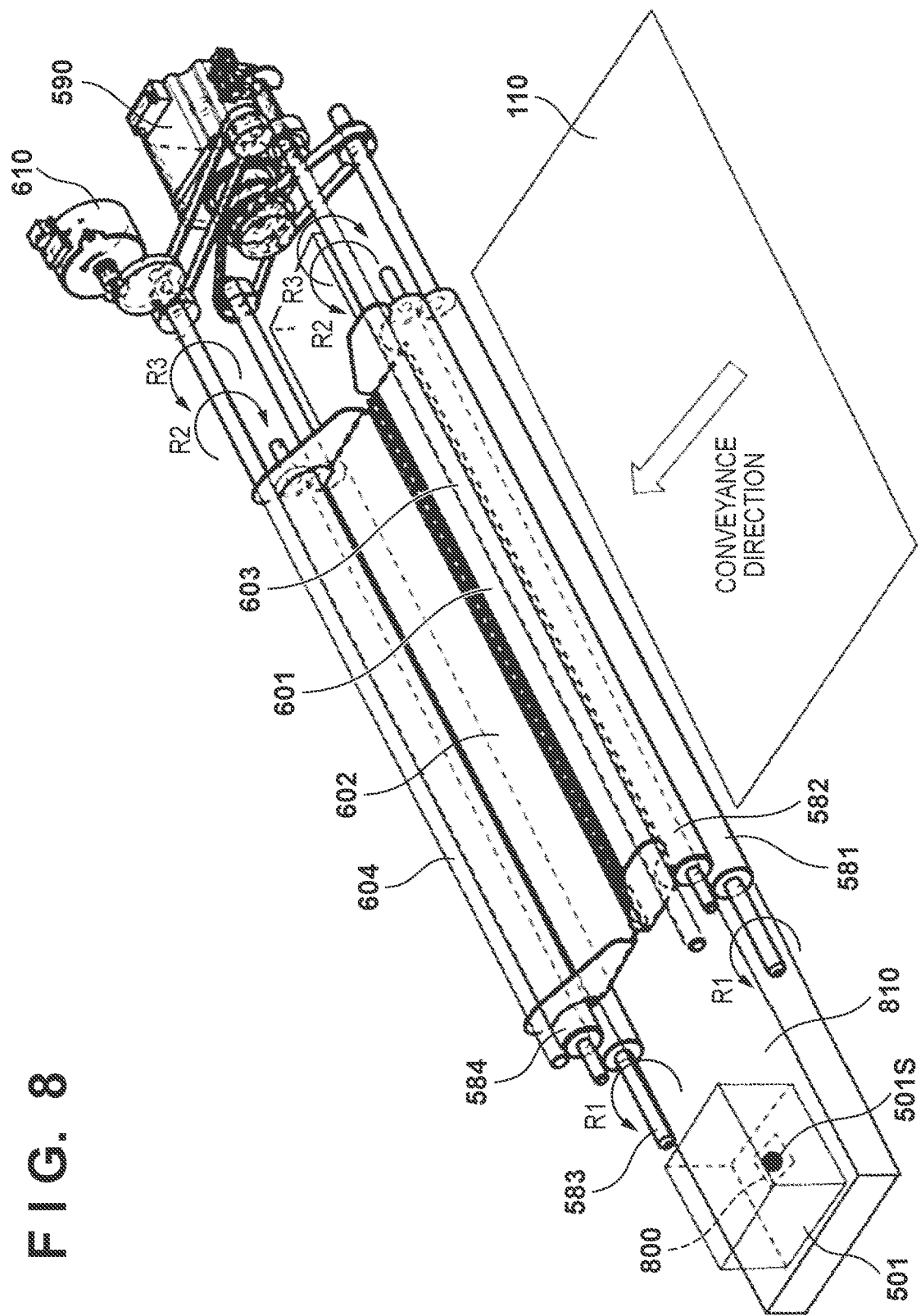
FIG. 8 is a schematic diagram of a configuration of the vicinity of the color measurement unit.

FIG. 8 shows a configuration of the surroundings of the color sensor 501. Note that FIG. 8 only shows the color sensor 501, and the moving mechanism of the color measurement unit 500 is omitted for simplification of the figure. A pair of rollers made up of a conveyance roller 581 and a conveyance roller 582 and a pair of rollers made up of a conveyance roller 583 and a conveyance roller 584 convey the sheet 110 in the conveyance direction. Note that the conveyance roller 581 and the conveyance roller 583 are driven and rotated by a drive unit 590, and the conveyance roller 582 and the conveyance roller 584 rotate respectively in accordance with rotation of the conveyance roller 581 and rotation of the conveyance roller 583. A backing member 810 is disposed between these two pairs of rollers. In addition, the color sensor 501 is configured to be movable in the direction of movement (direction that is orthogonal to the conveyance direction) between these two pairs of rollers. Note that, in a direction that is orthogonal to both the conveyance direction and the direction of movement, the color sensor 501 and the backing member 810 are disposed on the opposite sides to each other relative to a position to which the sheet 110 is conveyed. In the vicinity of an end portion in the direction of movement of the backing member 810, the white reference panel 800 is provided on a surface on a side of the backing member 810 on which the sheet 110 is conveyed. In FIG. 8, the color sensor 501 has moved to a position at which a color measurement position 501S thereof is within the white reference panel 800.

In addition, a conveyance guide shutter 601 and a conveyance guide shutter 602 are configured to be rotatable respectively about shafts 603 and 604 that are rotation shafts. Note that the conveyance guide shutters 601 and 602 are driven by a drive unit 610. As a result of the conveyance guide shutters 601 and 602 rotating in an R2 direction, the conveyance guide shutters 601 and 602 enter a "closed state". In addition, as a result of the conveyance guide shutters 601 and 602 turning in an R3 direction, the conveyance guide shutters 601 and 602 enter an "open state".

Operations related to color measurement that are performed by the color sensor 501 will be described below. Note that, in the following description, as shown in FIGS. 9A to 10B, the backing member 810 is divided into three regions 810a to 810c in the direction of movement. The region 810b is a region on which the sheet 110 moves. On the other hand, the regions 810a and 810c are regions on which the sheet 110 does not move. Note that the region 810a and the region 810c are positioned on the opposite sides of each other relative to the region 810b. In the present embodiment, the white reference panel 800 is provided in the region 810a.

FIG. 9A shows a state where the color measurement position 501S of the color sensor 501 is on the white reference panel 800. In addition, FIG. 9B shows a state where the color measurement position 501S of the color sensor 501 is in the region 810a, not on the white reference panel 800. In the present embodiment, the color sensor 501 stands by in the state in FIG. 9A. When performing forced light emission (step S10 in FIG. 5) before color measurement, the printer controller 103 moves the color sensor 501 to the position shown in FIG. 9B, namely a position where the white reference panel 800 is no longer irradiated with light from the light source 507. After forced light emission, the printer controller 103 moves the color sensor 501 to the position shown in FIG. 9A, and performs calibration by performing color measurement of the white reference panel 800. After calibration, the printer controller 103 causes the color sensor 501 to standby at the position shown in FIG. 9A until the sheet 110 is conveyed thereto.

As shown in FIGS. 10A and 10B, the test image formed on the sheet 110 includes m*n patches. Specifically, m patches are formed for each of n rows P1 to Pn. As shown in FIG. 10A, when the patches of the first row reach the color measurement position 501S of the color sensor 501 in the conveyance direction, the printer controller 103 performs color measurement of the m patches of the first row while moving the color sensor 501 that is standing by in the region 810a, toward the region 810b. After color measurement of the m patches of the first row, as shown in FIG. 10B, the printer controller 103 moves the color sensor 501 to a position on the region 810c. Thereafter, when the patches of the second row reach the color measurement position 501S of the color sensor 501 in the conveyance direction, the printer controller 103 performs color measurement of the m patches of the second row while moving the color sensor 501 toward the region 810a. After color measurement of the m patches of the second row, the printer controller 103 moves the color sensor 501 to a position on the region 810a. From this time onward, similar processing is repeated until color measurement of the patches of the n rows is performed.

As described above, the color sensor 501 is configured to be movable in the direction of movement that is orthogonal to the conveyance direction of the sheet 110. In addition, forced light emission of the color sensor 501 is performed at a position where the white reference panel 800 is not irradiated with light that is emitted by the color sensor 501. With this configuration, it is possible to prevent deterioration of the white reference panel 800 without providing a protection shutter and a moving mechanism of the protection shutter on the white reference panel 800. In addition, by providing the white reference panel 800 outside of the region 810b through which the sheet 110 passes, in other words in the region 810a through which the sheet 110 does not pass, it is possible to keep the white reference panel 800 from being dirty with paper powder.

Note that, in the above embodiment, before executing calibration that is performed by performing color measurement of the white reference panel 800, the color sensor 501 is moved to the position shown in FIG. 9B and performs forced light emission. However, the present disclosure is not limited to forced light emission before calibration is executed. The spectroscopy data shown in FIG. 4D obtained in previous calibration can be used, for example, and thus the present disclosure is also applicable to forced light emission before color measurement of a test image of the sheet 110 that is performed without performing calibration.

Note that, in the above embodiment, forced light emission is executed when the color sensor 501 has moved to a position at which the white reference panel 800 is no longer irradiated with light from the light source 507, but the position of the color sensor 501 at the time of forced light emission is not limited thereto. It is sufficient that, at the time of forced light emission, at least the optical axis of light emitted from the light source 507 is directed toward a region other than the white reference panel 800, and a portion of light from the light source 507 may be incident onto the white reference panel 800.

Note that, in the present embodiment, the white reference panel 800 is provided in the region 810a, but a configuration may also be adopted in which the white reference panel 800 is provided in the region 810c. In addition, in the present embodiment, the color sensor 501 is moved to the position shown in FIG. 9B, namely a position different from the position of the white reference panel 800 on the region 810a, and forced light emission is performed. To be more specific, forced light emission is performed between the white reference panel 800 and the region 810b that the sheet 110 passes through. However, forced light emission may be performed at any position at which the white reference panel 800 is not irradiated with light, and a position at which forced light emission is performed is not limited to the region 810a. A configuration can be performed in which, for example, forced light emission is performed at a position between the center in the direction of movement of the region 810b and the white reference panel 800. Note that, in order to shorten the time of calibration, it is advantageous to shorten the distance between a position at which color measurement of the white reference panel 800 can be performed and a forced light emission position.

Note that, in the present embodiment, the direction of movement of the color sensor 501 is a direction that is orthogonal to the conveyance direction of the sheet 110, in a range in which a plane that includes the conveyance direction and the direction of movement is parallel with the sheet 110, but the direction of movement is not limited to such a direction. Specifically, as long as, as a result of the color sensor 501 moving, color measurement of the white reference panel 800 can be performed and the color sensor 501 crosses the sheet 110, the direction of movement may also be a direction that is not orthogonal to the conveyance direction. That is to say, for example, in a range where a plane that includes the conveyance direction and the direction of movement is parallel with the sheet 110, a direction that intersects the conveyance direction of the sheet 110 can be a direction of movement.

Furthermore, although the above embodiment has been described using an electrophotographic image forming apparatus as an example, the present disclosure is also applicable to inkjet or dye-sublimation image forming apparatuses. Furthermore, the present disclosure can be applied to any apparatus in which calibration of a color measurement unit (color sensor) is performed using a reference member.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-185366, filed Nov. 5, 2020, which is hereby incorporated by reference herein in its entirety.

What is claimed is:

1. A color measurement apparatus comprising:
a color measurement sensor configured to perform color measurement of an image on a sheet, the color measurement sensor including a light source;
a reference member used for calibration of the color measurement sensor;
a motor configured to move the color measurement sensor to a first position at which the light source irradiates a region other than the reference member with light and a second position at which the light source irradiates the reference member with light; and
a controller configured to execute the calibration based on data obtained by causing, in a state where the color measurement sensor is located at the second position, the light source to irradiate the reference member with light,
wherein the controller is configured to cause the light source of the color measurement sensor to emit light at the first position for a predetermined period, and then move the color measurement sensor to the second position, before executing the calibration.

2. The color measurement apparatus according to claim 1, further comprising:
a conveyance roller configured to convey the sheet to be subjected to color measurement performed by the color measurement sensor,
wherein the reference member is disposed outside of a region through which the sheet that is being conveyed by the conveyance roller passes.

3. The color measurement apparatus according to claim 2, wherein the first position is closer to a position at which the reference member is disposed than a center of the region through which the sheet passes, in a direction orthogonal to a conveyance direction of the sheet.

4. The color measurement apparatus according to claim 2, wherein the first position is between a region through which a sheet passes and a position at which the reference member is disposed, in a direction orthogonal to a conveyance direction of the sheet.

5. The color measurement apparatus according to claim 1, wherein the controller is configured to execute the calibration by moving the color measurement sensor to the second position, and then causing the color measurement sensor to perform color measurement of the reference member.

6. The color measurement apparatus according to claim 1, wherein the controller is configured to cause the color measurement sensor to perform color measurement of an image on the sheet while causing the motor to move the color measurement sensor.

7. The color measurement apparatus according to claim 1, wherein the controller is configured to cause the light source to emit light at the first position before performing the calibration in order to stabilize light emission luminance of the light source.

8. A color measurement apparatus comprising:
a color measurement sensor configured to perform color measurement of an image on a sheet, the color measurement sensor including a light source;

a reference member used for calibration of the color measurement sensor;

a motor configured to move the color measurement sensor to a first position at which an optical axis of light emitted from the light source is directed toward a region other than the reference member and a second position at which an optical axis of light emitted from the light source is directed toward the reference member; and a controller configured to execute the calibration based on data obtained by causing, in a state where the color measurement sensor is located at the second position, the light source to irradiate the reference member with light, wherein the controller is configured to cause the light source of the color measurement sensor to emit light at the first position for a predetermined period, and then move the color measurement sensor to the second position, before executing the calibration.

9. The color measurement apparatus according to claim 8, further comprising:

a conveyance roller configured to convey the sheet to be subjected to color measurement performed by the color measurement sensor, wherein the reference member is disposed outside of a region through which the sheet that is being conveyed by the conveyance roller passes.

10. The color measurement apparatus according to claim 9, wherein the first position is closer to a position at which the reference member is disposed than a center of the region through which the sheet passes, in a direction orthogonal to a conveyance direction of the sheet.

11. The color measurement apparatus according to claim 9, wherein the first position is between a region through which a sheet passes and a position at which the reference member is disposed, in a direction orthogonal to a conveyance direction of the sheet.

12. The color measurement apparatus according to claim 8, wherein the controller is configured to execute the calibration by moving the color measurement sensor to the second position, and then causing the color measurement sensor to perform color measurement of the reference member.

13. The color measurement apparatus according to claim 8, wherein the controller is configured to cause the color measurement sensor to perform color measurement of an image on the sheet while causing the motor to move the color measurement sensor.

14. The color measurement apparatus according to claim 8, wherein the controller is configured to cause the light source to emit light at the first position before performing the calibration in order to stabilize light emission luminance of the light source.

15. An image forming apparatus comprising:

an image former configured to form an image on a sheet;

a color measurement sensor configured to perform color measurement of an image formed on a sheet by the image former, the color measurement sensor including a light source;

a reference member used for calibration of the color measurement sensor;

a motor configured to move the color measurement sensor to a first position at which the light source irradiates a region other than the reference member with light and a second position at which the light source emits irradiates the reference member with light; and a controller configured to execute the calibration based on data obtained by causing, in a state where the color measurement sensor is located at the second position, the light source to irradiate the reference member with light, wherein the controller is configured to cause the light source of the color measurement sensor to emit light at the first position for a predetermined period, and then move the color measurement sensor to the second position, before executing the calibration.

16. The image forming apparatus according to claim 15, wherein the image former is configured to form, on the sheet, a test image that includes a plurality of patches of different colors, and the controller is configured to cause the color measurement sensor to perform color measurement of the plurality of patches of the test image formed on the sheet after executing the calibration.

17. The image forming apparatus according to claim 16, wherein the controller is configured to update a color profile for converting image data based on a result of color measurement of the test image performed by the color measurement sensor, and the image former is configured to form an image on a sheet based on image data obtained through conversion performed using the color profile.

* * * * *